March 10, 1964  A. STRAUB ETAL  3,124,037
PHOTOGRAPHIC PROJECTOR
Original Filed May 22, 1957

INVENTORS
Albert Straub and
Josef Schleifer

By Michael S. Striker
agt.

3,124,037
PHOTOGRAPHIC PROJECTOR

Albert Straub, Stuttgart-Bad Cannstatt, and Josef Schleifer, Krumbach, Schwaben, Germany, assignors to Eugen Bauer G.m.b.H., Stuttgart-Unterturkheim, Germany
Original application May 22, 1957, Ser. No. 660,801. Divided and this application Nov. 1, 1960, Ser. No. 66,544
Claims priority, application Germany June 7, 1956
2 Claims. (Cl. 88—24)

The present invention relates to photographic projectors and more particularly to cinematographic projectors.

This is a divisional application of our copending patent application, now abandoned, Serial No. 660,801, filed May 22, 1957, and entitled "Photographic Projector."

With cinematographic projectors it is conventional to so arrange the parts that the operator can place the film on the projector and remove it from the projector from one side of the projector, and also all of the operating knobs for adjusting the various mechanisms of the projector are located on the same side of the projector where the film is placed in or removed from the projector. When such projectors are used in motion picture houses, for example, it is conventional to provide a pair of such projectors so positioned that the operator is located between the two projectors, and in this case the operating knobs are located at the sides of the projectors which are directed toward each other and also the film is placed in and removed from the projectors at the sides thereof which are directed toward each other so that the operator need not move from his position between the two projectors in order to operate the same.

This known arrangement has several disadvantages in that it is essential that the operator be located at a particular position so that he cannot move about in order to take care of other devices, for example, and in that it is necessary to provide projectors of different constructions in order to enable the operator to operate two projectors from a position between the same.

One of the objects of the present invention is to eliminate the necessity for providing projectors of different constructions.

Another object of the present invention is to provide a photographic projector which is capable of being operated from more than one position, so that the operator is not forced to remain in particular position in order to operate the projector.

A further object of the present invention is to provide a projector with means enabling a lamp of the image projecting part of the projector to be quickly exchanged.

An additional object of the present invention is to provide a projector with a means enabling a lamp of an optical sound reproducing part of the projector to be easily and quickly exchanged.

A still further object of the present invention is to provide a projector with a means enabling the sharpness of the image to be adjusted and at the same time enabling film to be placed in or removed from the projector without altering the adjustment for the sharpness of the image.

It is also an object of the present invention to provide an arrangement enabling all of these adjustments to be carried out at a plurality of parts of the projector.

The objects of the present invention also include the provision of structure capable of accomplishing all of the above objects and at the same time composed of simple and ruggedly constructed elements which are inexpensive to manufacture and assemble and which are very reliable in operation.

With the above objects in view, the present invention mainly consists of a photographic projector which includes a housing having a pair of opposite sides located at the exterior of the projector. A plurality of mechanisms are located within the housing and all of these mechanisms are adjustable. A plurality of manually operable adjusting means are also carried by the housing and this plurality of adjusting means are operatively connected to the plurality of mechanisms, respectively, for adjusting the same. Each of the plurality of manually operable adjusting means is accessible at both sides of the housing so that the operator may make any of the adjustments from either side of the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
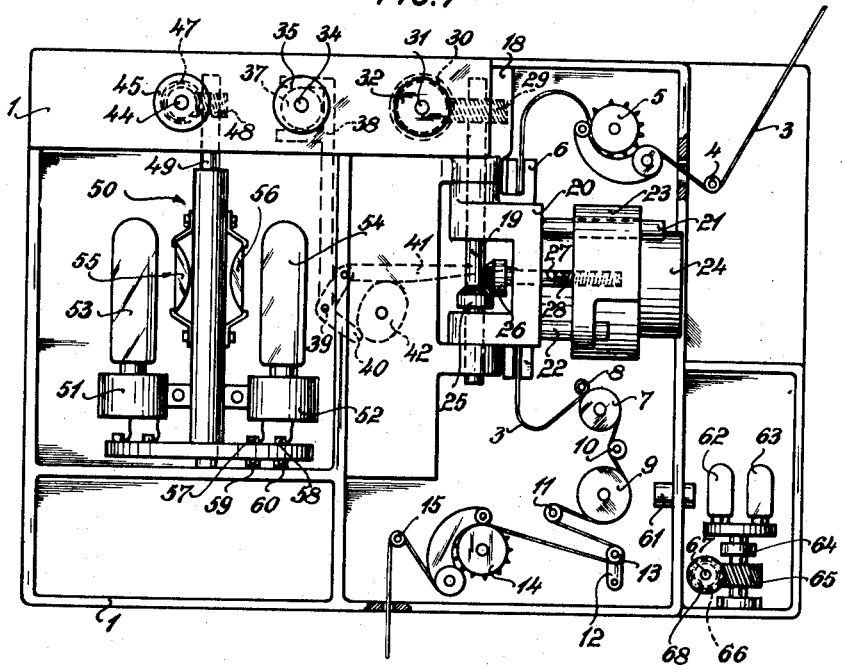
FIG. 1 is a front elevational, partly diagrammatic view of part of a photographic projector in accordance with the present invention, FIG. 1 showing a housing of the projector with covers of the housing removed so as to illustrate mechanisms carried by the housing.
Figure 2:
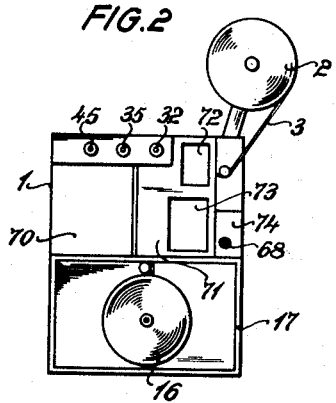
FIG. 2 is a digrammatic front elevational view of the entire projector with one of the housing covers removed.
Figure 3:
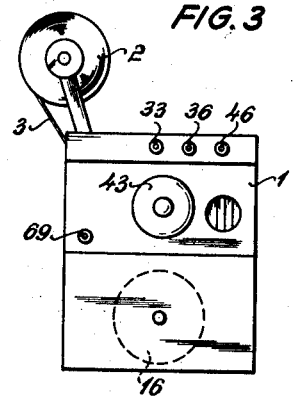
FIG. 3 is a diagrammatic rear elevational view of the entire projector, FIG. 3 showing the rear side of the projector which is not visible in FIG. 2.

Referring to the drawings, it will be seen that the projector of the invention includes a housing 1 the front side of which is visible in FIG. 2 and the rear side of which is visible in FIG. 3, FIG. 1 showing an upper part of the housing as it appears from the front side with several covers removed, as will be apparent from the description below. The housing carries a supply spool 2 from which the film 3 is delivered to the projector. As may be seen from FIG. 1, the film 3 is guided around a roller 4 rotatably carried by the housing 1, and then the film is transported by a toothed roller 5 the teeth of which engage the apertures of the film, the roller 5 providing an upper film loop, as is evident from FIG. 1. The film then moves along a film guide 6 in the form of a stationary plate and a movable plate provided with suitable apertures through which light passes in order to participate in the projection of an image, the right part of the film guide 6 of FIG. 1 being movable while the left part remains stationary. After moving through the film guide 6 the film engages a brake roller 7 which is turnably carried by the housing 1 and against which a roller 8 is urged so as to press the film against the brake roller 7, this roller providing the lower loop of the film. Then the film is guided around a guide roller 10 carried by the housing 1 to a sound reproducing drum 9 of an optical sound reproducing means of known construction, and from the drum 9 which is rotatably supported by the housing 1 the film passes about a film guiding roller 11 to the film guiding roller 13 which is carried by a lever 12 which is supported by the housing 1 for turning movement about an axis passing through the bottom end of the lever 12, a suitable spring acting on the lever 12 to urge the latter in a clockwise direction, as viewed in FIG. 1, so that the lever 12 together with the roller 13 maintain the film tensioned. From the roller 13 the film passes to another toothed roller 14 which is turnably carried by the housing 1, and from the toothed roller, 14 which is driven so as to transport the film, the film passes about a further guide roller 15 rotatably carried by the housing 1 to the take-up spool 16 which is rotatably mounted within a hollow base member 17 (FIG. 2) which carries the housing 1 and to which the housing 1 is rigidly fixed. The hollow base 17 is provided with a suitable cover which is not shown in the drawings. In this way the film is guided through the projector from the supply spool 2 to the take-up spool 16.

A bearing plate 18 (FIG. 1) forms part of the housing 1 and rotatably supports a shaft 19 for rotation about its axis while preventing shaft 19 from shifting longitudinally along this axis, this shaft 19 extending substantially vertically within the housing 1 and being located between the opposite sides thereof which are respectively visible in FIGS. 2 and 3. A carrier means 20 is turnably connected to the shaft 19 for turning movement about the axis thereof, a pair of ears of the bearing plate 18 preventing axial shifting of the carrier means 20 along the axis of the shaft 19, as is apparent from FIG. 1. The right movable part of the film guide 6 is fixed to the carrier means 20 for turning movement with the latter about the shaft 19, so that when it is desired to open the film guide the carrier means 20 is turned about the shaft 19 from the position shown in FIG. 1, and when it is desired to close the film guide the carrier means 20 is returned to the position of FIG. 1. This carrier means 20 includes a pair of elongated pins 21 and 22 which respectively extend parallel to the optical axis and which are fixed rigidly with the remainder of the carrier means so as to turn therewith about the shaft 19. An objective carrier 23 is in the form of a block formed with a pair of parallel bores through which the pins 21 and 22 respectively pass slidably, so that in this way the objective carrier 23 is shiftable in the direction of the optical axis back and forth to the right and left, as viewed in FIG. 1, along the carrier means 20–22. The objective carrier 23 carries a conventional objective 24, and the objective carrier 23 is provided with a threaded bore which threadedly receives a threaded portion 28 of a spindle 27 which extends parallel to the optical axis and which is turnably supported by the carrier means 20 for rotation about its own axis, the spindle 27 being prevented from shifting axially. A bevel gear 26 is fixed to the left end of the spindle 27, as viewed in FIG. 1, and meshes with another bevel gear 25 which is fixed to the shaft 19 for rotation therewith, so that whenever the shaft 19 is rotated about its axis the spindle 27 will turn so as to shift the objective carrier 23 in one direction or the other along the pins 21 and 22, and in this way the objective 24 will also be shifted along the optical axis so as to adjust the sharpness of an image projected by the projector.

The above-described elements 19—28 form an adjustable mechanism of the projector associated with the projecting of an image, and in accordance with the present invention a suitable manually operable means is operatively connected with this mechanism for adjusting the latter. This manually operable means includes a gear 29 fixed to the shaft 19 and meshing with a gear 30 which is fixed to a shaft 31 for rotation with the latter. It will be noted that the shaft 31 is perpendicular to the shaft 19, and the gears 29 and 30 are helical gears so that an angular transmission between the shaft 31 and the shaft 19 is provided by the meshing gears 30 and 29. The shaft 31 is supported for rotation about its axis by the housing 1 and the shaft 31 has a pair of free ends extending outwardly beyond the opposite sides of the housing, respectively. These free ends of the shaft 31 respectively have knobs 32 and 33 fixed thereto, the knob 32 being visible in FIGS. 1 and 2 while the knob 33 is visible in FIG. 3. Thus, the operator may grasp either the knob 32 or the knob 33 so as to turn the shaft 31 from either side of the housing of the projector, and in this way the sharpness of the image may be adjusted from either side of the housing with the structure of the invention.

The portion of the housing 1 which houses the above-described structure is covered by a suitable cover 71 shown in FIG. 2 and removably connected in any known way to the housing. This cover 71 is provided with windows 72 and 73 through which the above-described mechanism is visible. The shaft 31 and the knobs 32 and 33 are located at a different part of the housing from the hollow portion thereof which is covered by the cover 71, so that the knob 32 does not in any way interfere with the mounting of the cover 71 on the housing or the removal of the same from the housing.

When film is placed in or removed from the projector, the carrier means 20 is turned about the shaft 19 so as to open the film guide 6. During such turning the gear 26 will turn on the gear 25 which remains stationary with the shaft 19 so that the objective carrier 23 will be shifted together with the objective 24 and the focus of the projector will be temporarily disturbed. However, when the film guide is closed by returning the carrier means 20 to the position shown in FIG. 1 the gear 26 rotates on the gear 25 back to the position it had when the film guide was closed, and thus the orginal adjustment of the focus is again obtained when the film guide is closed, so that with the above-described structure the focus adjustment will not be disturbed by removing film from the projector and replacing film in the projector.

A second manually operable adjusting means is provided for adjusting another adjustable mechanism of the projector, and this second manually operable adjusting means includes a shaft 34 parallel to the shaft 31 and also rotatably carried by the housing 1, this shaft 34 also having a pair of free end portions respectively located beyond the opposite sides of the housing. A pair of knobs 35 and 36 (FIGS. 2 and 3) are respectively fixed to the free ends of the shaft 34 so that the latter is capable of being turned from either side of the housing.

Within the housing the shaft 34 fixedly carries an eccentric 37 which turns with the shaft 34, and this eccentric 37 cooperates with an elongated bar 38 which is guided by the housing 1 for longitudinal shifting movement, the bar 38 extending substantially vertically within the housing between the opposite sides thereof, as is evident from FIG. 1. A suitable means is provided for maintaining the bar 38 in cooperative relationship with the eccentric 37 so that when the latter is turned with the shaft 34 the elevation of the bar 38 will be changed, and this means is illustrated in FIG. 1 as taking the form of a forked upper end portion of the bar 38 having a pair of arms respectively located above and below the eccentric 37 so that as the latter turns the elevation of the bar 38 will be adjusted.

A lever 40 in the form of a bell crank is pivotally connected at 39 to the bar 38 for turning movement about an axis passing through the bar 38 adjacent the bottom end thereof, and thus the manually operable adjusting means 34—37 will adjust the elevation of the turning axis of the lever 40. This lever 40 is pivotally connected at its upper end, as viewed in FIG. 1, to a claw means 41 which moves the film in the film guide 6 in stepwise fashion in a known way, an eccentric 42 being driven by a motor 43 shown in FIG. 3 so as to actuate the claw means to repeatedly move the film in stepwise fashion. The eccentric 42 is carried by a shaft fixed to the motor 43 so as to be rotated by the latter at a predetermined speed which controls the number of frames projected per second. It is apparent that the framing adjustment may be carried out with the manually adjustable means 34—37. In other words, by changing the elevation of the pivotal connection 39 of the lever 40 to the bar 38, the stroke of the claw means 41 is so regulated that one frame is accurately projected on the screen at any given instant, and with this adjustment projection simultaneously of the upper part of one frame and the lower part of the next frame can be avoided.

A third manually operable adjusting means is provided for operating an additional adjustable mechanism of the projector, and this third manually operable adjusting means includes a shaft 44 parallel to the shaft 34 and rotatably carried by the housing 1, this shaft 44 also having a pair of opposite free ends respectively extending beyond the opposite sides of the housing 1. A pair of knobs 45 and 46 are respectively fixed to the free ends of the shaft 44, so that the latter shaft may be turned by the operator from either side of the housing.

The manually operable adjusting means 44—46 serve to adjust a lamp exchanging mechanism of the projector. Thus, a gear 47 is fixed to the shaft 44 within the housing 1 for rotation with the shaft 44, and this gear 47 meshes with a gear 48 which is fixed to a shaft 49 which is perpendicular to the shaft 44 and which is rotatably supported within the housing 1. The gears 47 and 48 are helical so that they provide an angular transmission, as is illustrated in FIG. 1. The shaft 49 forms part of a lamp exchanging mechanism 50, and this lamp exchanging mechanism 50 includes a pair of lamp sockets 51 and 52 carried by the shaft 49 for rotation therewith, the sockets 51 and 52 respectively carrying a pair of lamps 53 and 54. The shaft 49 carries a reflector 55 which cooperates with the lamp 53 and a reflector 56 which cooperates with the lamp 54, so that the pair of lamps respectively having a pair of reflectors cooperating therewith, and these reflectors are carefully positioned with respect to the lamps and turn together with the lamps about the axis of the shaft 49 when the latter is turned. A pair of electrical contacts 57 and 58 are connected electrically with each of the sockets 51 and 52, and these contacts 57 and 58 are carried by a plate which turns with the shaft 49, the contacts 57 and 58 having exposed bottom ends located at the underside of this plate and respectively engaging a pair of springy contact fingers 59 and 60 in order to have current supplied thereto, these springy contacts 59 and 60 being stationary with respect to the housing 1 and being connected in any suitable way to a source of current. Thus, with the position of the parts shown in FIG. 1, when the projector is turned on the lamp 54 will be illuminated. However, when the shaft 49 is turned through 180° from the position of FIG. 1 then the contacts associated with the socket 51 will engage the springy fingers 59 and 60 so that the lamp 53 will then be illuminated. With this construction if the lamp 54, for example, should suddenly become extinguished, the operator need only turn either of the knobs 45 or 46 so as to instantly locate the lamp 53 in the position formerly occupied by the lamp 54, and thus the projector may continue to operate practically without interruption. Then the operator may replace the lamp 54 with another lamp. It will be noted that the hollow portion of the housing which accommodates the above-described lamp exchanging mechanism is removably covered by a cover 70 shown in FIG. 2, so that in order to exchange a lamp the operator need only remove the cover 70. The light from the lamp in the operating position shown in FIG. 1 as occupied by the lamp 54 is directed through a suitable condenser lens unit (not shown) to the objective, this light passing through the film which is being transported by the claw means 41, and from the objective 24 the light causes the image to be projected upon a screen.

As was pointed out above, the drum 9 forms part of an optical sound reproducing mechanism. This sound reproducing mechanism includes the sound head lens 61 and the lamps 62 and 63. These lamps 62 and 63 are carried by the elongated lamp support 64 which is turnable about its vertical axis, this support 64 being turnably supported by the housing 1. In the position of the parts shown in FIG. 1 the lamp 62 is in the operating position, and upon turning of the support 64 through 180° the lamp 63 will be located in the operating position. When each lamp is in the operating position it is automatically illuminated by a contact arrangement similar to that described above in connection with the lamps 53 and 54.

The support 64 fixedly carries a gear 65 which meshes with a gear 66, the later gear being fixed to a shaft 67 for rotation with the latter, and it will be noted that the shaft 67 extends perpendicularly to the axis of turning of the lamp support 64. The gears 65 and 66 are helical gears so as to provide the desired angular transmission. The shaft 67 is turnably supported by the housing 1 and also has a pair of opposite free ends respectively extending beyond the opposite sides of the housing. These free ends of the shaft 67 respectively fixedly carry knobs 68 and 69, these knobs being located at the exterior of the housing so that the shaft 67 may be turned by the operator from either side of the housing and in this way at any time the operator may move one of the lamps 62 or 63 away from the operating position and replace it by the other lamp. The hollow portion of the housing 1 which accommodates the lamp exchanging arrangement shown at the lower right part of FIG. 1 is capable of being closed by a cover 74 which is removably connected to the housing 1 in any suitable way so that when it is desired to replace one of the lamps 62 and 63 it is only necessary to remove the cover 74. It will be noted that in this case the cover 74 must be provided with an opening through which the shaft 67 passes, and after the cover 74 is positioned on the housing the knob 68 is fastened with a set screw or the like to the shaft 67. Thus, when it is desired to exchange one of the lamps 62 or 63 the operator must first remove the knob 68 and then remove the cover 74, the reverse of these steps being performed when the parts are replaced.

With each of the above-described lamp exchanging mechanism only a pair of lamps have been discussed, but it is to be understood that each of these mechanisms may include more than two lamps equidistantly distributed about the turning axis of the mechanism, and furthermore each lamp exchanging mechanism may be provided with a suitable releasable stop means such as a ball and detent arrangement which will releasably position the mechanism accurately with a preselected one of the lamps in an operating position. Of course, as soon as the lamp 62, for example, stops operating the operator need only turn the knob 68 or the knob 69 so as to immediately locate the lamp 63 in the operating position, and then the lamp 62 may be exchanged for a fresh lamp while the projector continues to operate.

Also, it should be noted that the claw means 41 may be replaced by another claw means or by a claw means of a different type without changing the invention, the above-described mechanism for changing the elevation of the turning axis of the lever 40 being capable of cooperating with any type of claw means.

It will be noted that with the above-described structure not only can all operations be carried out from either side of the projector, but in addition all of the manually operable adjusting means which are operatively connected to mechanisms associated with the projection of the image are located adjacent the top end of the housing. Thus, all of the knobs 32, 33, 35, 36, 45, and 46 are easily and clearly visible to the operator at all times both when the projector is closed and all of the covers are mounted thereon as well as when the covers are removed and the projectors open so that at all times the operator can observe the knobs and can easily oversee the operation of the projector, and the possibility of error at any time is very greatly reduced.

It will be understood that each of the elements described above, or two or more together, may also find a useful application in other types of projectors differing from the types described above.

While the invention has been illustrated and described as embodied in cinematographic projectors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic projector, in combination, a housing; an elongated shaft extending substantially vertically in said housing and supported for rotation about its axis by said housing; carrier means connected to said shaft for turning movement about the axis thereof and including a block member and a pair of pins fixed to said block member and projecting spaced from each other substantially normal to the axis of the shaft to one side of said block member; an objective carrier mounted on said pins of said carrier means for shifting movement therealong in a direction parallel to the optical axis; an objective carried by said carrier; an adjusting spindle turnably supported for rotation about its axis by said block member of the carrier means, extending parallel to the optical axis of the projector, and threadedly connected to said objective carrier so that when said spindle is turned said carrier will be shifted along said pins with said objective for adjusting the position of the latter; transmission means interconnecting said spindle with said shaft for turning said spindle about its axis when said shaft is turned; and manually operable means accessible from opposite sides of said housing at the exterior thereof and operatively connected to said shaft for turning the latter about its axis so as to adjust the objective.

2. In a photographic projector, in combination, a housing; an elongated shaft extending substantially vertically in said housing and supported for rotation about its axis by said housing; carrier means connected to said shaft for turning movement about the axis thereof; an objective carrier mounted on said carrier means for shifting movement therealong in a direction parallel to the optical axis; an objective carried by said carrier; an adjusting spindle turnably supported for rotation about its axis by said carrier means, extending parallel to the optical axis of the projector, and threadedly connected to said objective carrier so that when said spindle is turned said carrier will be shifted along said carrier means with said objective for adjusting the position of the latter; transmission means interconnecting said spindle with said shaft for turning said spindle about its axis when said shaft is turned, said transmission means including a pair of bevel gears meshing with each other and respectively fixed to said shaft and said spindle; and manually operable means accessible from opposite sides of said housing at the exterior thereof and operatively connected to said shaft for turning the latter about its axis so as to adjust the objective.

References Cited in the file of this patent

UNITED STATES PATENTS

| | | |
|---|---|---|
| 1,804,268 | Northington | May 5, 1931 |
| 1,943,378 | Elms | Jan. 16, 1934 |
| 2,368,634 | Boecking | Feb. 6, 1945 |
| 2,399,658 | Banker | May 7, 1946 |
| 2,485,709 | Davock | Oct. 25, 1949 |